United States Patent
Asner et al.

(10) Patent No.: US 10,496,645 B1
(45) Date of Patent: Dec. 3, 2019

(54) SYSTEM AND METHOD FOR ANALYSIS OF A DATABASE PROXY

(71) Applicant: Ignite ScalArc Solutions, Inc., Austin, TX (US)

(72) Inventors: Noam Asner, Arlington, MA (US); Doron Levari, Newton, MA (US)

(73) Assignee: Ignite ScalArc Solutions, Inc., Austin, TX (US)

(*) Notice: Subject to any disclaimer, the term of this patent is extended or adjusted under 35 U.S.C. 154(b) by 827 days.

(21) Appl. No.: 14/985,277

(22) Filed: Dec. 30, 2015

Related U.S. Application Data

(63) Continuation of application No. 14/064,210, filed on Oct. 28, 2013, now abandoned.

(51) Int. Cl.
*G06F 16/2453* (2019.01)
*G06F 16/2455* (2019.01)

(52) U.S. Cl.
CPC .... *G06F 16/24544* (2019.01); *G06F 16/2456* (2019.01)

(58) Field of Classification Search
CPC ............ G06F 17/30466; G06F 16/2456
See application file for complete search history.

(56) References Cited

U.S. PATENT DOCUMENTS

| | | |
|---|---|---|
| 5,675,791 A | 10/1997 | Bhide et al. |
| 5,799,306 A | 8/1998 | Sun et al. |
| 6,801,921 B2 | 10/2004 | Tsuchida et al. |
| 6,873,989 B1 | 3/2005 | Martin, Jr. |
| 6,950,848 B1 | 9/2005 | Yousefi'zadeh |
| 7,386,554 B2 | 6/2008 | Ripley et al. |
| 7,644,087 B2 | 1/2010 | Barkai et al. |
| 7,860,865 B2 | 12/2010 | Uppala |
| 7,890,463 B2 | 2/2011 | Romem et al. |
| 8,055,647 B2 | 11/2011 | Takatsuka et al. |
| 8,996,505 B1 | 3/2015 | Garcia-Alvarado et al. |
| 2002/0198872 A1 | 12/2002 | MacNicol et al. |
| 2003/0217033 A1 | 11/2003 | Sandler et al. |
| 2004/0117037 A1 | 6/2004 | Hinshaw et al. |
| 2005/0021511 A1 | 1/2005 | Zarom |
| 2006/0129528 A1 | 6/2006 | Miyamoto et al. |
| 2007/0025351 A1 | 2/2007 | Cohen |
| 2007/0203910 A1 | 8/2007 | Ferguson et al. |
| 2007/0288530 A1 | 12/2007 | Romem et al. |
| 2008/0140696 A1 | 6/2008 | Mathuria |
| 2009/0012932 A1 | 1/2009 | Romem et al. |
| 2009/0019007 A1 | 1/2009 | Niina |
| 2009/0144632 A1 | 6/2009 | Mendez |
| 2009/0216714 A1 | 8/2009 | Gonzalez et al. |
| 2009/0248753 A1 | 10/2009 | Tsai et al. |

(Continued)

OTHER PUBLICATIONS

Stack Overflow, 'What is the Difference Between Group by and Order by in sql', Aug. 14, 2009. Retrieved Sep. 26, 2012 fromhttp://stackoverflow.com/questions/1277460/whatis-the-difference-between--group-by-and-order-by-in-sql.

(Continued)

*Primary Examiner* — Dawaune A Conyers

(57) ABSTRACT

A system and method for processing a database query may include determining a set of tables referenced in a query; representing the set of tables by vertices of a graph; and, if the graph is incomplete, then determining the query is associated with a shard conflict. A system and method may determine a query is not associated with a shard conflict if, and only if, the graph is complete.

10 Claims, 4 Drawing Sheets

(56) References Cited

U.S. PATENT DOCUMENTS

| | | |
|---|---|---|
| 2009/0271412 A1 | 10/2009 | Lacapra et al. |
| 2009/0319344 A1 | 12/2009 | Tepper et al. |
| 2010/0017395 A1 | 1/2010 | Wayn et al. |
| 2010/0057745 A1 | 3/2010 | Li |
| 2010/0082540 A1 | 4/2010 | Isaacson et al. |
| 2010/0088311 A1 | 4/2010 | Du Fosse et al. |
| 2010/0131490 A1 | 5/2010 | Lamb et al. |
| 2010/0161593 A1 | 6/2010 | Paulsen et al. |
| 2010/0161651 A1 | 6/2010 | Cras |
| 2010/0223562 A1 | 9/2010 | Carapella et al. |
| 2011/0093499 A1 | 4/2011 | Zhou et al. |
| 2011/0173219 A1 | 7/2011 | Bent et al. |
| 2011/0246480 A1 | 10/2011 | Levari et al. |
| 2012/0109892 A1 | 5/2012 | Novik et al. |
| 2014/0101091 A1 | 4/2014 | Brown et al. |
| 2014/0108421 A1 | 4/2014 | Isaacson et al. |
| 2015/0227521 A1 | 8/2015 | Levari et al. |

OTHER PUBLICATIONS

U.S. Appl. No. 13/077,523—Office Action dated Jun. 27, 2013, 12 pages.
U.S. Appl. No. 13/077,526—Office Action dated Oct. 5, 2012, 17 pages.
U.S. Appl. No. 13/077,526—Final Office Action dated Feb. 14, 2013, 18 pages.
U.S. Appl. No. 13/077,526—Office Action dated Mar. 13, 2014, 17 pages.
U.S. Appl. No. 13/077,526—Final Office Action dated Dec. 18, 2014, 16 pages.
U.S. Appl. No. 13/077,526—Response to Final Office Action dated Dec. 18, 2014 filed Feb. 25, 2015, 9 pages.
U.S. Appl. No. 13/077,526—Respopnse to Office Action dated Mar. 13, 2014 filed Sep. 15, 2014, 10 pages.
U.S. Appl. No. 13/077,526—Response to Final Office Action dated Feb. 14, 2013 filed May 8, 2013, 9 pages.
U.S. Appl. No. 13/077,526—Response to Office Action dated Oct. 5, 2012 filed Dec. 24, 2012, 10 pages.
U.S. Appl. No. 13/077,523—Office Action dated Nov. 12, 2015, 24 pages.
U.S. Appl. No. 14/064,210—Final Office Action dated Jul. 6, 2015, 21 pages.
U.S. Appl. No. 14/064,210—Response to Office Action dated Feb. 6, 2015, filed Apr. 16, 2015, 11 pages.
U.S. Appl. No. 14/064,210—Office Action dated Feb. 6, 2015, 19 pages.
U.S. Appl. No. 14/064,210—Final Office Action dated Jul. 2, 2014, 19 pages.
U.S. Appl. No. 14/064,210—Response to Final Office Action dated Jul. 2, 2014, filed Nov. 11, 2014, 10 pages.
U.S. Appl. No. 14/064,210—Office Action dated Feb. 26, 2014, 14 pages.
U.S. Appl. No. 14/064,210—Response to Office Action dated Feb. 26, 2014, filed May 27, 2014, 9 pages.
U.S. Appl. No. 13/077,523—Response to Office Action dated Nov. 12, 2015, filed Mar. 11, 2016, 8 pages.
U.S. Appl. No. 13/077,523—Response to Final Office dated Apr. 2, 2015, filed Jun. 9, 2015, 10 pages.
U.S. Appl. No. 13/077,523—Response to Office Action dated Jun. 27, 2013, filed Sep. 16, 2013, 12 pages.
U.S. Appl. No. 61/320,575—Provisional Application filed Apr. 2, 2010, 23 pages.
U.S. Appl. No. 13/077,523—Office Action dated Oct. 8, 2014, 17 pages.
U.S. Appl. No. 13/077,523—Response to Office Action dated Oct. 8, 2014, filed Jan. 8, 2015, 6 pages.
U.S. Appl. No. 13/077,523—Final Office Action dated Nov. 18, 2013, 12 pages.
U.S. Appl. No. 13/077,523—Response to Final Office Action dated Nov. 18, 2013, filed Jan. 6, 2014, 14 pages.
U.S. Appl. No. 13/077,523—Advisory Action dated Feb. 6, 2014, 3 pages.
U.S. Appl. No. 13/077,523—Response to Advisory Action dated Feb. 6, 2014, filed Feb. 18, 2014, 16 pages.
U.S. Appl. No. 61/936,921—Provisional Application filed Feb. 7, 2014, 19 pages.
U.S. Appl. No. 13/077,526—Notice of Allowance dated Apr. 23, 2015, 8 pages.
U.S. Appl. No. 14/834,237—Office Action dated Sep. 22, 2016, 26 pages.
U.S. Appl. No. 13/077,523—Advisory Action dated Nov. 10, 2016, 8 pages.
U.S. Appl. No. 13/077,523—Advisory Action dated Sep. 16, 2016, 3 pages.
Asplund, John S., Masters Thesis, Michigan Technological University, "Edge Coloring BIBDS and constructing MOELRs" Jan. 2010, 158 pages.
Faultsich et al., "Implementing Linguistic Query Languages Using LoTos," Nov. 18, 2005, 30 pages.
Pema, "On the Tractability and Intractability of Consistent Conjunctive Query Answering," ACM, Mar. 2011, 7 pages.
Rohloff et al., High-Performance, Massively Scalable Distributed Systems Using the MapReduce Software Framework: The SHARD Triple-Store, Oct. 17, 2010, 5 pages.
Final Office Action dated Jul. 6, 2015, mailed in U.S. Appl. No. 14/064,210, pp. 1-25.
Response to Non-Final Office Action dated Feb. 6, 2015, as filed in U.S. Appl. No. 14/064,210 dated Apr. 16, 2015, pp. 1-11.
Non-Final Office Action dated Feb. 6, 2015, mailed in U.S. Appl. No. 14/064,210, pp. 1-23.
Request for Continued Examination, mailed in U.S. Appl. No. 14/064,210 dated Nov. 11, 2014, pp. 1-11.
Final Office Action dated Jul. 2, 2014, mailed in U.S. Appl. No. 14/064,210, pp. 1-21.
Response to Non-Final Office Action dated Feb. 26, 2014, as filed in U.S. Appl. No. 14/064,210 dated May 27, 2014, pp. 1-9.
Non-Final Office Action dated Feb. 26, 2014, mailed in U.S. Appl. No. 14/064,210, pp. 1-22.
Response to Non-Final Office Action dated Oct. 16, 2018, as filed in U.S. Appl. No. 14/834,237 dated Mar. 18, 2019, pp. 1-8.
Non-Final Office Action dated Oct. 16, 2018, mailed in U.S. Appl. No. 14/834,237, pp. 1-29.
Response to Non-Final Office Action dated Jan. 23, 2018, as filed in U.S. Appl. No. 14/834,237 dated Apr. 23, 2018, pp. 1-16.
Non-Final Office Action dated Jan. 23, 2018, mailed in U.S. Appl. No. 14/834,237, pp. 1-13.
Request for Continued Examination dated Mar. 28, 2017, as filed in U.S. Appl. No. 14/834,237, pp. 1-3.
Notice of Allowance dated Jan. 4, 2017, mailed in U.S. Appl. No. 14/834,237, pp. 1-15.
Response to Non-Final Office Action dated Sep. 22, 2016, mailed in U.S. Appl. No. 14/834,237, pp. 1-11.
Final Office Action dated Dec. 11, 2018, mailed in U.S. Appl. No. 13/077,523, pp. 1-21.
Response to Non-Final Office Action dated May 7, 2018, as filed in U.S. Appl. No. 13/077,523 dated Oct. 9, 2018, pp. 1-22.
Non-Final Office Action dated May 7, 2018, mailed in U.S. Appl. No. 13/077,523, pp. 1-18.
Request for Continued Examination(RCE) and RCE Submission as filed in U.S. Appl. No. 13/077,523 dated Feb. 12, 2018, pp. 1-11.
Final Office Action dated Aug. 11, 2017, mailed in U.S. Appl. No. 13/077,523, pp. 1-18.
Response to Non-Final Office Action dated Apr. 11, 2017, as filed in U.S. Appl. No. 13/077,523 dated Jul. 11, 2017, pp. 1-12.
Non-Final Office Action dated Apr. 11, 2017, mailed in U.S. Appl. No. 13/077,523, pp. 1-18.
Request for Continued Examination as filed in U.S. Appl. No. 13/077,523 dated Jan. 6, 2017, pp. 1-3.
Supplemental Amendment as filed in U.S. Appl. No. 13/077,523 dated Dec. 6, 2016, pp. 1-9.
Advisory Action dated Nov. 10, 2016, mailed in U.S. Appl. No. 13/077,523, pp. 1-9.

(56) References Cited

OTHER PUBLICATIONS

Certification and Request for Consideration under the after final consideration pilot program 2.0, as filed in U.S. Appl. No. 13/077,523 dated Oct. 7, 2016, pp. 1-14.
Advisory Action dated Sep. 16, 2016, mailed in U.S. Appl. No. 13/077,523, pp. 1-4.
Response after Final Office Action dated Jul. 8, 2016, as filed in U.S. Appl. No. 13/077,523 dated Aug. 11, 2016, pp. 1-10.
Final Office Action dated Jul. 8, 2016, mailed in U.S. Appl. No. 13/077,523, pp. 1-18.
Notice of Allowance dated Jan. 17, 2019, mailed in U.S. Appl. No. 14/615,903, p. 1-77.
Response to Non-Final Office Action dated May 30, 2018, as filed in U.S. Appl. No. 14/615,903 dated Oct. 30, 2018, p. 1-12.
Non-Final Office Action dated May 30, 2018, mailed in U.S. Appl. No. 14/615,903, pp. 1-39.
Request for Continued Examination (RCE) and RCE Submission, as filed in U.S. Appl. No. 14/615,903 dated May 16, 2018, pp. 1-14.
Final Office Action dated Nov. 16, 2017, mailed in U.S. Appl. No. 14/615,903, pp. 1-39.
Response to Non-Final Office Action dated Apr. 21, 2017, as filed in U.S. Appl. No. 14/615,903 dated Jul. 20, 2017, pp. 1-14.
Non-Final Office Action dated Apr. 21, 2017, mailed in U.S. Appl. No. 14/615,903, pp. 1-28.
Sen, Anith. "Concentrating Row Values in Transact-SOL," https://www.simple-talk.com/sqUt-sql-programming/concatenatingow-values-in-transact-sql/, Jul. 31, 2008, 32 pages.

| NO. OF EMPLOYEES | DEP. NAME | DEP. ID |
|---|---|---|
| 32 | MARKETING | 1 |
| 48 | OPERATIONS | 2 |
| . | . | . |

215

| DEP. ID | EMPLOYEE NAME | EMPLOYEE ID |
|---|---|---|
| 3 | JOHN | 2 |
| 3 | MARK | 3 |
| 4 | JACOB | 4 |
| 2 | JACK | 5 |

216

210

| NO. OF EMPLOYEES | DEP. NAME | DEP. ID |
|---|---|---|
| 60 | R&D | 3 |
| 17 | MANAGEMENT | 4 |
| . | . | . |

225

| DEP. ID | EMPLOYEE NAME | EMPLOYEE ID |
|---|---|---|
| 1 | DAVID | 1 |
| 4 | OLIVER | 6 |
| 2 | WILLIAM | 7 |
| 4 | EMMA | 9 |

220

226

SHARD 315/320 (310)

| NO. OF EMPLOYEES | DEP. NAME | DEP. ID |
|---|---|---|
| 32 | MARKETING | 1 |
| 48 | OPERATIONS | 2 |

| DEP. ID | EMPLOYEE NAME | EMPLOYEE ID |
|---|---|---|
| 1 | DAVID | 1 |
| 2 | JACK | 5 |
| 2 | WILLIAM | 7 |

SHARD

| NO. OF EMPLOYEES | DEP. NAME | DEP. ID |
|---|---|---|
| 60 | R&D | 3 |
| 17 | MANAGEMENT | 4 |

| DEP. ID | EMPLOYEE NAME | EMPLOYEE ID |
|---|---|---|
| 3 | JOHN | 2 |
| 3 | MARK | 3 |
| 4 | JACOB | 4 |
| 4 | OLIVER | 6 |
| 4 | MARY | 8 |
| 4 | EMMA | 9 |

SHARD

| KEY | TABLE IDENTIFICATION |
|---|---|
| DEP. ID | DEPARTMENTS TABLE |
| DEP. ID | EMPLOYEES TABLE |

FIG. 3

```
Boolean identifyShardConflict(query) {
        /* 1. Preparation work. Each distributed table in N tables is assigned a
unique index which identifies it. 0..n-1
        2. Blocks are groups of vertices representing unconnected parts in the
graph. Initially, a graph doesn't include edges yet, so each block is a "singleton". We begin
with n blocks.
        3. Blocks are complete and orthogonal - For every vertex, the vertex
appears in exactly one block. */
        shardTabls = findShardTables(query);
        AssignIndexesToShardTables(shardTables) //0. . . n-1
        blocks = {{0}, {1},..., {n-1})
        /* Linking blocks. For every binary predicate that links tables i and j,
the blocks that contain i and j are linked by unifying blocks together. As a consequence, the
number of blocks decreases by one.*/
        For each binaryPredicate in query {
        If binary predicate is Si.SKi=Sj.SKj then {
    blocki = block that contains vertex i // find block contains vertex i.
    blockj = block that contains vertex j // find block contains vertex j.
    if (blocki != blockj) then {
       blockij = unification of blocki and blockj        // unify blocki and blockj
       remove blocki and blockj from blocks;             // remove the old 2 blocks
       add blockij to blocks                              //Add the new unified block.
             }
          }
       }
    // One block consisting of all vertexes is an indication of having a complete graph
       return (number of blocks equals 1);
}
```

FIG. 5

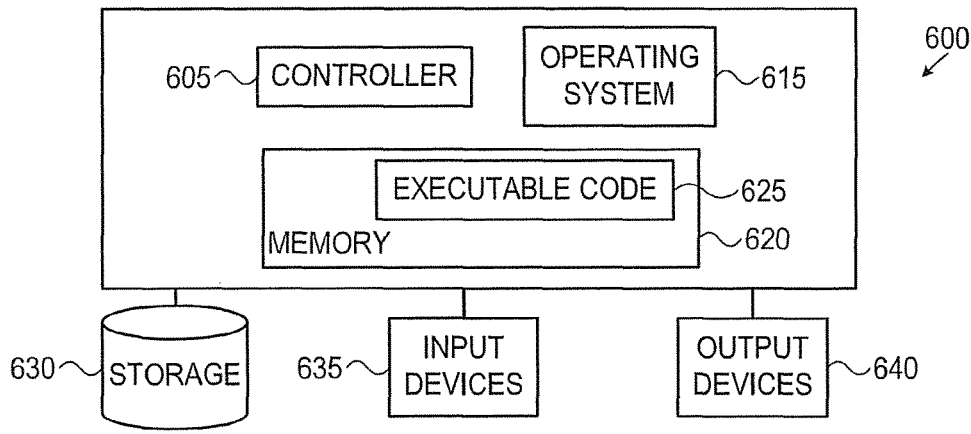

SYSTEM AND METHOD FOR ANALYSIS OF A DATABASE PROXY

This application is a continuation of co-pending U.S. patent application Ser. No. 14/064,210 filed on 28 Oct. 2013.

BACKGROUND OF THE INVENTION

Databases are used for storing digital data or information. In addition to storing data, modern database systems enable users and applications to search for, and retrieve stored data. Various systems and methods are used in order to improve and provide services. For example, database management systems (DBMSs) are designed to interact with users or applications and provide data storage and retrieval operations.

Horizontal partitioning is a database design or principal whereby rows of a table in a database are stored separately. As known in the art, a database shard is a partition in a database. Specifically, a shard is a horizontal partition in a database. Accordingly, an individual partition in a database may be referred to as a shard or a database shard. As known in the art, shards may be used to partition a large database across a number of servers or partitions. Generally, sharding is used in order to distribute or split data over multiple machines.

However, if a table is split across a number of shards, when retrieving data from the table, data from multiple shards needs to be joined, aggregated or merged.

SUMMARY OF EMBODIMENTS OF THE INVENTION

A system and method for analyzing database queries may include determining a set of tables referenced in a query; representing the set of tables as, or by, vertices of a graph; and if the graph is incomplete then determining the query is associated with a shard conflict. A system and method may determine a query is not associated with a shard conflict if and only if the graph is complete. A system and method may include storing a set of tables on at least one shard based on a common key. A system and method may include determining a first and a third vertices are connected if the first and a second vertices on the graph are connected and the second and the third vertices on the graph are connected. A system and method may include distributing a first and second tables over at least two shards based on a common key. A common key used for distributing a first and second tables over at least two shards may be a table column.

A system and method may storing a first and second portions of a table on a respective first and second shards based on a respective first and second ranges of values of the common key. A system and method may determine that data from at least two shards is required in order to complete a record in a response for a query if at least one vertex in the graph is not connected to at least one other vertex in the graph. A method for determining a shard conflict may include distributing a plurality of tables across two or more shards according to a common key; receiving a query and determining a set of tables related to the query; representing the set of tables by vertices of a graph; and, if at least on vertex in the graph is not connected to at least one other vertex in the graph then determining the query is associated with a shard conflict.

A controller may be configured to determine a set of tables referenced in a query; a controller may be configured to determine which tables in the query are included in a set of relevant tables. A controller may represent the set of tables by vertices of a graph; and if the graph is incomplete then determine the query is associated with a shard conflict. A controller may be adapted to determine a query is not associated with a shard conflict if and only if the graph is complete.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 3 shows distribution of tables across shards according to embodiments of the present invention;

FIG. 5 shows pseudo code according to embodiments of the present invention; and

FIG. 6 shows high level block diagram of an exemplary computing device according to embodiments of the present invention.

Figures 1, 2:
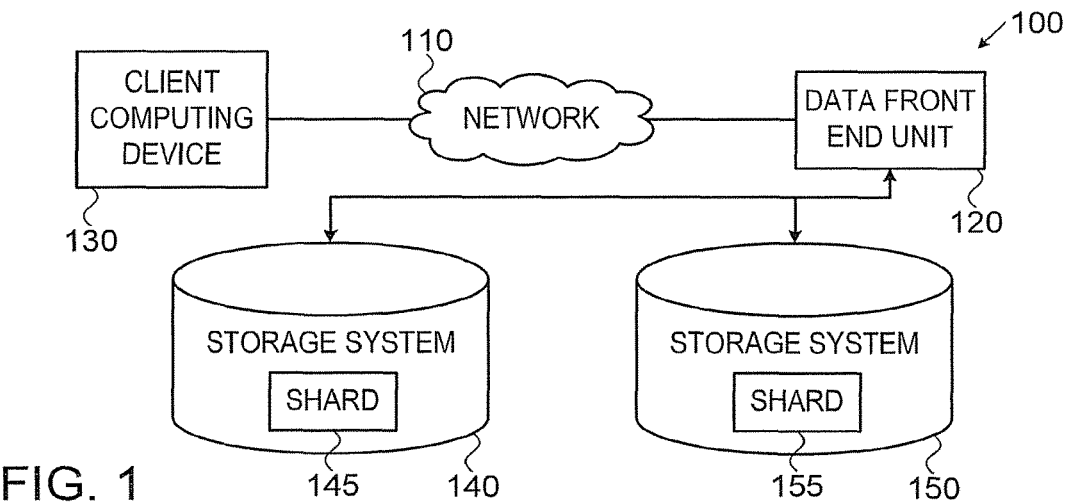
FIG. 1 is a high level block diagram of a system according to embodiments of the present invention.
FIG. 2 shows distribution of tables across shards as known in the art.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory processor-readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is now made to FIG. 1, which shows a high-level block diagram of a system 100 according to embodiments of the present invention. As shown, system 100 may include a network 110 that may be, may comprise or may be part of, a private or public internet protocol (IP) network, or the internet, or a combination thereof. Additionally or alternatively, network 110 may be, comprise or be part of, a global system for mobile communications (GSM) network. For example, network 110 may include or comprise an IP network such as the internet, a GSM related network and any equipment for bridging or otherwise connecting such networks as known in the art.

As shown by blocks 140 and 150, system 100 may include a plurality of storage systems. Storage systems 140 and 150 may include or may be any suitable storage systems. For example, storage systems 140 and 150 include one or more hard disk drives, removable or fixed storage units. In some embodiments, storage systems 140 and 150 may be, or include, network storage devices and may be geographically distant from one another or from other components of system 100. Storage systems 140 and 150 may each include a server and/or a management system (e.g., a DBMS). As shown, storage system 140 may include shard 145 and storage system 150 may include shard 155. Shards 145 and 155 may be shards as known in the art, e.g., associated with a partition or server in storage systems 140 and 150 respectively.

For the sake of clarity and simplicity, only one shard is shown in each of storage systems 140 and 150, however, it will be understood that any number of shards may be included in storage systems 140 and 150. Likewise, for the sake of clarity, only two storage systems (140 and 150) are shown, however, it will be understood that system 100 may include any number of storage systems that may be similar to storage systems 140 and 150.

As shown by block 120, system 100 may include a database front end unit 120, referred to herein as DFEU 120. As known in the art, a front end or proxy may provide an interface between a database and its clients. For example, a proxy may receive (or intercept) requests sent from a user or application to a database, examine the requests, possibly process the requests and either transfer the requests to the database or generate requests to the database based on received or intercepted requests. A proxy may receive responses from a database, process the responses and send the (possibly processed) responses to clients of the database. DFEU 120 may be a proxy or front end or it may be included in a proxy or front end. DFEU 120 may be any module, unit or component designed and configured to perform functionalities and methods as described herein. For example, in an embodiment, DFEU 120 is a computing device similar to computing device 600 including a memory and controller wherein the memory stores instructions that, when executed by the controller, cause the controller to determine whether or not a shard conflict exists. For example, a computing device similar to computing device 600 determines whether or not a shard conflict will be encountered when generating a response for a query.

A computing device similar to computing device 600 may perform analysis of join, merge or aggregation operations related to a database as described herein. DFEU 120 may receive requests or queries from users or applications, determine whether or not a shard conflict exists with relation to a request or query, process the requests or queries and interact with storage systems 140 and 150 in order to respond to queries or perform related tasks. For example, a request for data stored in storage systems 140 and 150 may be sent (e.g., from a user or application) to DFEU 120 over network 110. DFEU 120 may process a request and, based on processing a request, DFEU 120 may interact with storage systems 140 and 150 in order to retrieve requested data or perform other operations. DEFU 120 may send or otherwise provide retrieved or requested data to the requesting entity.

As shown, system 100 may include, or be connected to, a client computing device 130. Client computing device 130 may include or may be, for example, a server, a personal computer or a desktop computer, a mobile or laptop computer. In some embodiments, client computing device 130 may be a network device, a smartphone or a mobile phone or any other suitable computing device capable of at least communicating with DEFU 120 over network 110. Client computing device 130 may be any suitable computing device configured or adapted to enable a user or an application to interact with DEFU 120.

As discussed, if a table is split into portions, and portions of the table are stored on more than one shard, then, in order to retrieve data from the table, a plurality of shards may need to be accessed. Accordingly, a system may need to join, aggregate or merge data portions retrieved from a plurality of shards in order to provide the requested data. In other cases, if data from two tables is needed in order to complete a request for data and each of the two tables is stored on a different shard then two shards need to be accessed and data retrieved from the two shards needs to be merged, aggregated or joined. Clearly, the more shards involved m the process, the greater the challenge.

Reference is made to FIG. 2, showing a distribution of tables across shards. As shown, in an exemplary case, tables 215, 216, 225 and 226 which are tables related to departments and employees in an organization, are stored on shards 210 and 220.

As shown, table 215 stored on shard 210 is a department table that includes a column with a department identification number (labeled "Dep. ID"), where an identification number of a department is stored. As shown, table 215 further includes a department name column (labeled "Dep. NAME") and an additional column (labeled "No. of employees") for the number of employees in each department. It will be understood that other or additional columns may be included in table 215. Table 225 stored on shard 220 is similar to table 215. Other types of tables and other data may be stored.

As shown, table 216 stored on shard 210 is an employee table. As shown, table 216 includes a column for employee identification (labeled "Employee ID"), a column with employee name (labeled "Employee NAME") and a column that indicates the department to which the employee belongs (labeled "Dep. ID"). For example, as shown, employee Jack belongs to the operations department (Dep. ID "2"). Table 226 stored on shard 220 is similar to table 216.

Queries or requests from a database typically involve some logical relations between entities. For example, a user may request the list (e.g., names of employees) of all employees in the management department. Using the tables and shards shown by FIG. 2, a system may have to retrieve data from both shards 210 and 220 in order to generate a response. For example, having found the employee named David in table 226 on shard 220, a system now needs to access table 215 on shard 210 in order to find the name of the department with department ID 1 (the marketing department in the current example).

As referred to herein, a shard conflict exists if, for at least one record or other object in a response to a query, data from at least two shards must be retrieved. For example and as described, a response or a result record may need to include an employee with the "Name" of the employee's department name. If the result record can be composed using data in a single shard then, as referred to herein, no shard conflict exists. However, if, for example, a cartesian product (and possibly filtering of the cartesian product result) of data from two or more shards are required then a system may determine a shard conflict exists. For example, when distributing tables over shards as shown in FIG. 2, to generate a record that includes both an employee and the name of the relevant department, a system may need to retrieve both table 215 and table 225, generate a cartesian product as known in the art to produce a set of products and then filter out all products that do not match a criteria.

For example, since it may not be known in advance which employee in tables 215 and 226 belongs to which department in table 215, a cartesian product would include a set that includes all possible combinations of all employees and all departments. The resulting (typically very large) set may subsequently need to be processed in order to filter out irrelevant products or identify relevant ones.

As discussed, there typically exists some logic or rational with respect to queries that require joining, aggregating or joining data items from two or more shards. According to an embodiment of the invention, a plurality of tables (or other constructs in a database or shards) are distributed across two or more shards according to a common key. When distributing a plurality of tables based on the same key, the key is referred to herein as a common key to indicate the key is common to the plurality of tables. For example, instead of storing tables 215, 216, 225 and 226 on shards 210 and 220 as shown in FIG. 2, a different arrangement may be used.

Reference is made to FIG. 3, showing a distribution of tables across shards according to embodiments of the invention. As shown by tables 315, 320, 335 and 340, tables 215, 216, 225 and 226 may be distributed on shards 310 and 330 based on a common (or same) key. For example, shards 310 and 330 may be stored on storage systems 140 and 150 respectively as shown by shards 145 and 155.

In an exemplary case or embodiment, the department identification (Dep. ID), key or value may be used in order to split a department table and store the resulting tables on shards 310 and 330. As shown, shard 310 may store a department table 315 that may include departments with a department identification in a specific range, e.g., one to two (1-->2). As shown, an employees table 320 in shard 310 may include employees belonging to departments in departments table 315. For example, only employees belonging to departments with an identification key value in the specific range (1-->2) are included in employees table 320 stored on shard 310. Similarly, shard 330 includes a departments table 335 that includes departments having a department key value or identification number that is in the range of three to four (3-->4) and shard 330 also includes an employees table 340 that includes employees associated with the respective range of departments. For example and as shown, employees table 340 includes employees that belong to departments having a department identification value in the range of three to four (3-->4).

Otherwise described, in this example, employees and departments are shard tables, sharded by department identification. Any other key (or column in a table) may be used for splitting tables as exemplified by FIG. 3. Any number of tables may be split and distributed or re-distributed across a plurality of a respective number of shards based on a common key or column as described herein. For example, an organization may maintain an expenses table that lists expenses per departments and per employees. In an embodiment, an employees table, departments table and expenses table may be distributed across a number of shards based on a common key (e.g., a department identification). Accordingly, details related to the employees and expenses of a specific department may be stored (and found) in the same shard that stores details of the specific department.

As shown by table 350, an embodiment may include a distribution table or list. For example, DFEU 120 may store and maintain a table or list similar to table 350 on storage 140. As shown by table 350, a distribution table or list may include, for each table, a key used for distributing the table and an identification of the table. Other entries in a distribution list may be a key value or range of values, an identification of shards used for storing the table and the like. For the sake of simplicity, names of tables are shown under table identification in table 350, however, it will be understood that any identification may be used, e.g., an internal identification used by DFEU 120. Similarly, as shown, entries in the key column in table 350 are "Dep. ID", in accordance with examples described herein, however, it will be understood that any identification of a key may be used, e.g., an identification of keys as generated by DFEU 120.

For example, a distribution list or table maintained by DFEU 120 indicates that a common key to be used is the department identification in the departments table. Although not shown by table 350, a distribution table may further indicate that the range of 1 to 2 is stored on shard 310 in tables 315 and 320 (depending on whether it is a department or employee), the range of 3 to 4 is stored on tables 335 and 340 shard 330 and so on. For example, two entries in table 350 may be related to departments of an organization and may include a respective first and second key ranges and a respective first and second shards. Accordingly, when new data is to be added to a table, DFEU 120 may consult a distribution table and determine which table on which shard is to be updated with the new data.

For example, in the exemplary scenario described herein with reference to FIG. 3, if a new employee is to be added to the management department, DFEU 120 may consult the distribution table in order to find the shard and table for the given key value (4 in this case) and determine that the new employee is to be added to table 340 on shard 330 since these are the table and shard for storing entries using the common key of department identification as described.

Embodiments of the invention may examine a query, request or any interaction with a database and determine whether or not a shard conflict is associated with the request, query or interaction. For the sake of simplicity, the term query is used herein to refer to any message or request received, from a client (that may be a user or an application) by a database.

In an embodiment, DFEU 120 examines a query and determines whether or not the query causes or generates a shard conflict. If a shard conflict is determined, DFEU 120 may perform a number of actions. For example, if a shard conflict is determined, the relevant query may be rejected or it may be passed on to an entity for further prosecution. In an embodiment, if a shard conflict is identified then the query may be sent to all relevant shards, responses from all relevant shards may be collected and a response to the query may be generated by joining, merging or aggregating records from the responses received from the relevant shards.

For example, upon detecting a shard conflict, DFEU 120 (or another unit to which DFEU 120 may send a request that causes a shard conflict) may split a query into a number of queries which are then executed on a number of shards. By executing a query on a shard, it is meant performing an operation based on the query with respect to data in the shard. For example, if the query includes searching for a data element then executing the query on a shard includes searching for the element in data stored in the shard.

Results from a number of shards may then be aggregated or joined as known in the art. Any system or method for splitting a query (after DFEU 120 determines that a shard conflict exists with respect to the query) may be used without departing from the scope of the invention.

For example, if a shard conflict is determined or identified, a query or request may be executed separately on each relevant shard and results from a plurality of prosecutions on a plurality of shards may be unified to produce a response.

If DFEU 120 determines no shard conflict is related to a query (or, as described herein, If DFEU 120 determines no shard conflict exists), DFEU 120 may identify the relevant shard or shards and send the query to the relevant shards for further processing. For example, using entries in a table similar to table 350 described herein, DFEU 120 determines which shard stores the relevant table and sends the query to the shard for prosecution.

It will be noted that a request may not cause a shard conflict while still requiring accessing multiple shards. For example, if data is distributed as shown in FIG. 3, a query for the list of ALL departments may require accessing more than one shard but no aggregation (or joining) of data from multiple shards is required in order to complete (or produce or generate) records in the response. On the other hand, a statement may request data for a specific department and still cause a shard conflict. For example, a query for ALL employees of "Marketing" when distribution is as shown in FIG. 2 will cause a shard conflict since, in order to determine the name of departments for employees found in table 226 on shard 220, data from table 215 on shard 210 needs to be used.

As described, DFEU 120 may examine a query and determine whether or not all tables or other data constructs referenced in the query or relevant to the query are stored on the same shard. In an embodiment, DFEU 120 examines a query and determines which tables in the query are the set of relevant tables by identifying the set of tables which are referenced by the query or which are relevant to the query. For example, DFEU 120 identifies a "FROM" clause in a query. As known in the art, a "FROM" clause in a structured query language (SQL) indicates the tables from which data is requested. Accordingly, DFEU 120 may examine a query and may determine the tables that need to be accessed in order to generate a response for the query. It will be understood that DFEU 120 may be configured to parse any applicable query or request and that any method of identifying the relevant tables in a database may be used by embodiments of the invention.

In the discussion below, a query is related to, includes or references, a set of shard tables denoted here by $\{S_0, \ldots, S_{n-1}\}$, and, for each $0<=i<=N-1$, $SK_i$ is the key based on which table $S_i$ is distributed across shards. For example, shard table $S_i$ may be table 215 and $SK_i$ may be the department identification number or column as described herein. For example, in an embodiment, a key is a column number.

DFEU 120 may represent the query as a graph where the tables are represented as vertices on the graph and for each binary predicate $S_i.SK_i=S_j.SK_j$ there's an edge between $S_i$ and $S_j$. The binary predicate $S_i.SK_i=S_j.SK_j$ as used herein is generally the statement the key $SK_i$ of table $S_i$ is the same as the key $SK_j$ of table $S_j$.

From transitivity, DFEU 120 may determine that if, $S_i.SK_i=S_j.SK_j$ and, in addition, $S_j.SK_j=S_m.SK_m$, then there are edges between $S_j$ and $S_m$ and between $S_i$ to $S_m$. To determine a shard conflict, DFEU 120 may check or determine whether or not the graph is complete. As described herein, in an embodiment, if DFEU 120 determines the graph is complete then DFEU 120 further determines no shard conflict exists with respect to the relevant query. In an embodiment, DFEU 120 determines a query is not associated with a shard conflict if, and only if, the graph is complete.

As referred to herein, a graph is complete if each vertex on the graph is connected to all other vertices on the graph. As referred to herein, two vertices on a graph are connected if and only if there is an edge between them.

In an embodiment, DFEU 120 determines whether or not a graph is complete. For example, DFEU 120 determines a graph is complete if there exists a path (comprising one or more edges) from any vertex on the graph to any other vertex on the graph. In an embodiment, DFEU 120 determines the graph is incomplete if, for at least one vertex on the graph, there exists no path of edges to another vertex on the graph.

In an embodiment, if all vertices representing tables on a graph are connected then DFEU 120 may determine no shard conflict exists with relation to the query. If the graph is incomplete, that is, at least one vertex on the graph is not connected by a line or edge (or a plurality of edges as described) to at least one other vertex on the graph, then DFEU 120 determines that the graph is incomplete and a shard conflict exists.

For example, in the case shown by FIG. 2, tables 215, 216, 225 and 226 are not distributed by a common or same key and, accordingly, if tables 215, 216, 225 and 226 are relevant to a query, then DFEU 120 determines a shard conflict exists (e.g., both shards 220 and 210 need to be accessed). In another case, e.g., as shown by FIG. 3, if the relevant tables are the employees and department tables, DFEU 120 identifies that these two tables are distributed across shards using the same or common key (the department ID as described) and therefore determines no shard conflict exists with respect to the query.

Figure 4A:
FIG. 4A graphically shows graphs according to embodiments of the present invention.

Reference is made to FIGS. 4A, 4B, 4C and 4D that graphically depict example graphs, vertices and edges according to embodiments of the invention. As shown by FIG. 4A, the relevant tables in a query are 81 and 82 and if the keys used to distribute tables 81 and 82 are the same (as indicated by S1.SK1=S2.SK2) then DFEU 120 may determine an edge exists between, or connects, the two vertices as shown and no shard conflict exists. Otherwise described, in this example and as shown by FIG. 4A, selecting * from S1 and S2 where S1.SK1=S2.SK2 does not result a shard conflict as indicated by the line connecting S1 and S2 (where "*" may be any element in S1 and S2).

Figure 4B:
FIG. 4B graphically shows graphs according to embodiments of the present invention.

As shown by FIG. 4B, since the key used for S1 is not the same as the one used for S2 (e.g., when the parameter or key used for distributing S1 over shards is not the same parameter or key used for distributing S2 over shards) no edge (or connection) exists between the vertices and therefore, in this example, DFEU 120 determines a shard conflict exists. Otherwise described, in this example and as shown by FIG. 4B selecting * from S1 and S2 where S1.SK1=S2.col will generate a shard conflict as indicated by an absence of a line connecting S1 and S2.

Figure 4C:
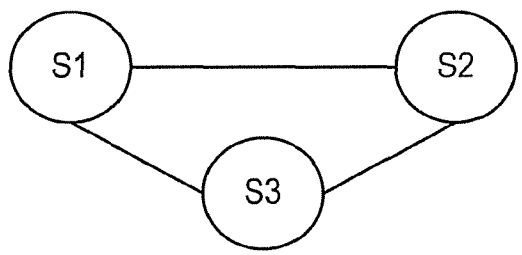
FIG. 4C graphically shows graphs according to embodiments of the present invention.

As exemplified by FIG. 4C, since the keys used for tables S1, S2 and S3 are the same (as indicated by (S1.SK1=S2.SK2) and (S2.SK2=S3.SK3), the graph is complete, edges connect all vertices and therefore, in this case, DFEU 120 may determine no shard conflict arises. Note that if the key of tables S1 and S2 are the same and the keys of tables S2 and S3 then DFEU 120 may determine that the keys of S1 and S3 are the same as well. Otherwise described, in this example and as shown by FIG. 4C, selecting * from S1 join S2 on (S1.SK1=S2.SK2) join S3 on (S2.SK2=S3.SK3) does not generate or cause a shard conflict as indicated by the lines connecting S1, S2 and S3.

Figure 4D:
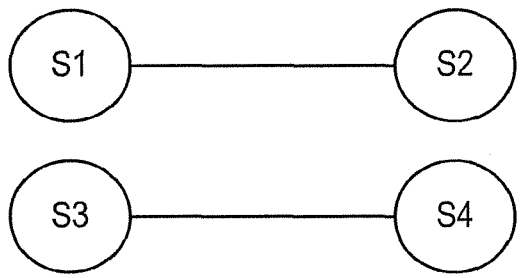
FIG. 4D graphically shows graphs according to embodiments of the present invention.

As shown by FIG. 4D, if only some of the vertices are connected DFEU 120 may determine a shard conflict exists. For example, as shown by FIG. 4D, vertex S4 is not connected to vertex S2, therefore, the graph shown in FIG. 4D is incomplete. For example, although the keys used for tables $S_1$ and $S_2$ are the same, and the keys used for tables $S_3$ and $S_4$ are the same, not all vertices are connected because the key used for tables S1 and S2 is not the same as the key used for tables S3 and S4. Accordingly, in the case shown by FIG. 4C DFEU 120 may determine a shard conflict exists. Otherwise described, in this example and as shown by FIG. 4D selecting * from S1 join S2 on (S1.SK1=S2.SK2) join S3 join S4 on (S3.SK3=S4.SK4) will cause or generate a shard conflict, for example, as indicated by absence of lines connecting S3 and S2 with S1 and S2.

Reference is made to FIG. 5 showing pseudo code according to embodiments of the invention. Code similar to the pseudo code shown in FIG. 5 may be used by DFEU 120 in order to determine whether or not a shard conflict as described herein is expected when responding to, or otherwise processing, a query. As common in the art, the patterns "//", "/*" and "*/" are used in FIG. 5 to indicate or denote comments in the code. Other languages and other specific code may be used.

Generally, for "N" distributed tables, each table may be assigned a unique identification or index, accordingly, the pseudo code shown in FIG. 5 is for tables numbered 0 to N−1. For example, when determining which tables are referenced in a query, DFEU 120 also may determine the number of tables and sets "N" to the correct number. In an embodiment, DFEU 120 associates each of the tables identified as related to the query with a unique value or number selected from values of 0 to (N−1).

Blocks are used in the pseudo code shown in FIG. 5 to represent vertices in a graph, where vertices represent tables as described herein. Any suitable object may be used to implement blocks, e.g., a memory that stores a value.

In an embodiment, each block represents one or more vertices. In an embodiment, initially or at a first step, each block is a singleton. As known in the art, a singleton is a mathematical expression that describes a group consisting one element, in the present example, initially, a singleton describes a group consisting a single vertex. Accordingly, initially, a graph includes N vertices and no edges since no vertices are yet connected by edges.

For example, initially, the block consisting or representing table 1 is the singleton {1} and the block consisting or representing table n−3 is the singleton {n−3}. Accordingly, initially, for any $vertex_i$, where: $0<=i<=N-1$, the vertex is contained in (or represented by) the block {i}.

In an embodiment, at any given point of the process, blocks are orthogonal (e.g., a logical intersection of any two blocks is an empty group) and a unification of all blocks contains or represents all vertices.

As shown, if it is determined that a first and second tables (e.g., table "i" and table "j" as shown) are distributed using the same key then the blocks containing or representing the tables are joined by unifying them into one block. In one embodiment, unifying, joining or merging a first and second blocks into a third block connects two vertices groups respectively represented by the first and second blocks. As a result of merging or unifying a first and second blocks into a third block, the third block now represents the two vertices groups previously represented by the first and second blocks.

In an embodiment, blocks represent unconnected vertices or parts of the graph. For example, following the creation of the third block as described, no edges are determined between any blocks on the graph, e.g., between the third block and any other blocks representing vertices on the graph. Accordingly, in an embodiment, blocks represent unconnected parts of graph.

Accordingly and as further shown, if, at the end of the process, only one block remains then it is determined that no shard conflict exists. For example and as shown, the pseudo code in FIG. 5 will return one ("1") that may be interpreted as "TRUE" if only one block remains, indicating that no shard conflict exists with respect to a query related to the N tables identified. As shown, the pseudo code in FIG. 5 will return zero ("0") that may be interpreted as "FALSE" if more than one block remains, indicating that a shard conflict exists, or is to be expected, with respect to the query.

Blocks as described may be realized or implemented using any suitable method or means. For example, in an embodiment, each block is a set of N bits, each bit identified by its index and, in order for a block to contain or represent table "i", bit "i" in the block is set. Accordingly, in such specific implementation or embodiment, in order to unify, join or merge two blocks representing tables "i" and "j", a new block that has bits "i" and "j" set is created and the new block replaces the two blocks previously used for representing tables "i" and "j". Accordingly, when identifying two tables distributed using the same key, the number of blocks is reduced by one since a single block is now used to represent both tables.

It will be understood that any applicable method or system may be used in order to represent vertices of a graph, determine edges connecting vertices, and determining whether or not a shard conflict is expected for a query by without departing from the scope of the invention. For example, other methods for representing vertices may use objects other than sets of bits as described herein, may use other methods for joining objects when an edge is identified etc.

Special cases may need to be addressed. For example, if, based on analyzing a query, DFEU 120 determines that an "OR" condition (as further described below) exists then DFEU 120 may analyze a number of relations between tables and determine whether or not a shard conflict exists or is to be expected based on an analysis of a number of relations or branches. For example, an "OR" condition may be in the form of: select an employee from tables $S_1$, $S_2$ and $S_3$ where the same key is used for distributing tables $S_1$ and $S_2$ as described herein and, in addition, the same key is used for distributing tables $S_1$ and $S_3$ or the key used for distributing table $S_2$ is some column or key of $S_3$. For example, using the terminology used herein, such condition or criteria may be expressed by:

Select employee from 51, S2, S3 where S1.SK1=S2.SK2 AND ((S2.SK2=S3.SK3) OR (S2.SK2=S3.Col)). In this case, two branches or conditions that DFEU 120 may check are:

1) S1.SK1=52.SK2 AND S2.SK2=S3.SK3 and
2) S1.SK1=S2.SK2 AND S2.SK2=S3.Col. where S3.Col may be any column of S3 as specified in a query.

Accordingly, DFEU 120 may check the two conditions above as described herein and, only if both or all conditions are satisfied then DFEU 120 may determine that no shard conflict exists, otherwise, DFEU 120 may determine a shard conflict exists or is to be expected. Any other logical terms that may appear in a query (e.g., "if", "else" and the like) may be parsed and analyzed by DFEU 120 and all logical branches or conditions may be examined as described herein. In an embodiment, DFEU 120 checks all possible or logical branches in a query, generates a set of logical statements and only if all logical statements indicate that no shard conflict exists then DFEU 120 determines no shard conflict is associated with responding to the query or request. Generally, DFEU 120 may ignore non-sharded tables except for special cases. For DFEU 120 may be configured to server queries or requests from a master or global table using a predefined logic or protocol.

Reference is made to FIG. 6, showing high level block diagram of an exemplary computing device according to embodiments of the present invention. Computing device 600 may include a controller 605 that may be, for example, a central processing unit processor (CPU), a chip or any suitable computing or computational device, an operating system 615, a memory 620, a storage 630, an input devices 635 and an output devices 640. In an embodiment, DFEU 120 includes components included in computing device 600.

Operating system 615 may be a commercial operating system. Memory 620 may be or may include, for example, a Random Access Memory (RAM), a Dynamic RAM (DRAM), a Flash memory, or other suitable memory units or storage units. Memory 620 may be or may include a plurality of, possibly different memory units.

Executable code 625 may be any executable code, e.g., an application, a program, a process, task or script. Executable code 625 may be executed by controller 605. For example, executable code 625 may be an application that performs operations described herein with respect to DFEU 120. Executable code 625 may be an application that performs the methods described herein. Controller 605 may be configured to perform methods described herein for example by executing code or software, for example stored in memory 620.

Where applicable, executable code 625 may carry out operations described herein in real-time. Computing device 600 and executable code 625 may be configured to perform methods described herein in real-time. For example, computing device 600 and executable code 625 may update, process and/or act upon information at the same rate the information, or a relevant events, are received. For example, in an embodiment, computing device 600 process queries and determines whether or not a shard conflict exists at the rate the queries are received from a plurality of client computing devices 130.

In some embodiments, more than one computing device 600 may be used. For example, a plurality of computing devices that include components similar to those included in computing device 600 may be connected to a network and used as a system. For example, a plurality of computing devices 600 may be used in order to deploy a plurality of DFEU 120 units, e.g., when scaling up a database by adding storage systems similar to storage systems 140 and 150.

Storage 630 may be or may include, for example, a hard disk drive or other suitable removable and/or fixed storage units. Content may be stored in storage 630 and may be loaded from storage 630 into memory 620 where it may be processed by controller 605. Input devices 635 may be or may include a mouse, a keyboard, a touch screen or pad or any suitable input device. Output devices 640 may include one or more displays, speakers and/or any other suitable output devices.

Any applicable input/output (I/O) devices may be connected to computing device 600 as shown by blocks 635 and 640. For example, a wired or wireless network interface card (NIC).

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 620, computer-executable instructions such as executable code 625 and a controller such as controller 605.

A system according to embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. In some embodiments, a system may include or may be, a personal computer, a desktop computer, a mobile computer, a laptop computer, a notebook computer or any other suitable computing device. Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method for analyzing join operations in a database proxy, the method comprising:

identifying a set of N relevant shard tables referenced in a query, the query received by the proxy, wherein N>1;
representing the referenced shard tables as vertices of a graph having N vertices $\{S_0, \ldots S_{N-1}\}$, each of the vertices representing a corresponding one of the referenced shard tables, $SK_i$ being a key based upon which the shard table represented by $S_i$ is distributed across shards, and $SK_j$ being a key based upon which the shard table represented by $S_j$ is distributed across shards;

for each pair of vertices $S_i$ and $S_j$ for ($0<=i<=N-1$) and ($0<=j<=N-1$) and $i \neq j$, inserting into the graph an edge connecting vertices $S_i$ and $S_j$ if and only if (a) $SK_i$ is the same key as $SK_j$ and (b) $SK_i$ and $SK_j$ are defined to have matching values or value ranges;

if and only if the graph contains a path comprising one or more edges from each vertex on the graph to all other vertices on the graph, determining the query will not cause a shard conflict, and upon determining the query will not cause a shard conflict, consulting a distribution table to identify a shard storing the referenced shard tables; and executing the query on the shard.

2. The method of claim 1 further comprising, for each pair of vertices $S_i$ and $S_j$ for ($0<=i<=N-1$) and ($0<=j<=N-1$) and $i \neq j$, consulting a distribution table to determine the key $SK_i$ and its value or value range for table $S_i$ and to determine the key $SK_j$ and its value or value range for table $S_j$.

3. The method of claim 1 further comprising, if and only if the graph contains at least one pair of vertices for which no path of edges exist from one vertex of the pair to the other vertex of the pair, determining the query will cause a shard conflict.

4. The method of claim 3, further comprising:
splitting the query into a plurality of queries, and
executing the plurality of queries on a plurality of shards.

5. The method of claim 3, further comprising:
consulting a distribution table to identify relevant shards storing the referenced shard tables;
executing the query separately on each relevant shard;
receiving responses from the relevant shards; and
joining, merging or aggregating responses received from the relevant shards.

6. A system comprising:
a memory; and
a controller, the controller configured to:
identify N referenced shard tables referenced in a query received by the proxy, where N>1;
representing the referenced shard tables as vertices of a graph having N vertices $\{S_0, \ldots S_{N-1}\}$, each of the vertices representing a corresponding one of the referenced shard tables, $SK_i$ being a key based upon which the shard table represented by $S_i$ is distributed across shards, and $SK_j$ being a key based upon which the shard table represented by $S_j$ is distributed across shards;

for each pair of vertices $S_i$ and $S_j$ for ($0<=i<=N-1$) and ($0<=j<=N-1$) and $i \neq j$, inserting into the graph an edge connecting vertices $S_i$ and $S_j$ if and only if (a) $SK_i$ is the same key as $SK_j$ and (b) $SK_i$ and $SK_j$ are defined to have matching values or value ranges;

if and only if the graph contains a path comprising one or more edges from each vertex on the graph to all other vertices on the graph, determined the query will not cause a shard conflict;

consult a distribution table to identify a shard storing the reference shard tables upon determination that the query will not cause a shard conflict; and executing the query on the shard.

7. The system of claim 6 wherein, for each pair of vertices $S_i$ and $S_j$ for ($0<=i<=N-1$) and ($0<=j<=N-1$) and $i \neq j$, the controller is further configured to:

Consult a distribution table to determined the key $SK_i$ and its value or value range for table $S_i$, and to determine the key $SK_j$ and its value or value range for table $S_j$.

8. The system of claim 6 wherein, if and only if the graph contains at least one pair of vertices for which no path of edges exist from one vertex of the pair to the other vertex of the pair, determine the query will cause a shard conflict.

9. The method of claim 8, the controller further configured to:
split the query into a plurality of queries; and
execute the plurality of queries on a plurality of shards.

10. The system of claim 8, the controller further configured to:
consult a distribution table to identify relevant shards storing the referenced shard tables, execute the request separately on each relevant shard, receive responses from the relevant shards, and
join, merge or aggregate responses received from the relevant shards.

* * * * *